United States Patent
Kobayashi et al.

[11] Patent Number: 5,243,859
[45] Date of Patent: Sep. 14, 1993

[54] THERMO-TYPE AIR FLOW METER

[75] Inventors: Chihiro Kobayashi; Atsushi Miyazaki, both of Katsuta; Nobukatsu Arai, Ushiku, all of Japan

[73] Assignee: Hitachi, Ltd., Tokyo, Japan

[21] Appl. No.: 679,316

[22] Filed: Apr. 2, 1991

[30] Foreign Application Priority Data

Apr. 2, 1990 [JP] Japan ................................. 2-88049

[51] Int. Cl.⁵ .............................................. G01F 1/68
[52] U.S. Cl. ............................... 73/204.27; 73/204.25
[58] Field of Search ................... 73/202.5, 118.2, 200, 73/204.11, 204.16, 204.18, 204.19, 204.23, 204.25, 204.27

[56] References Cited

U.S. PATENT DOCUMENTS 4,709,581 12/1987 Nishimura et al. .................... 73/202
4,887,577 12/1992 Arai et al. ........................... 73/118.2

Primary Examiner—Donald O. Woodiel
Assistant Examiner—R. Biegel
Attorney, Agent, or Firm—Antonelli, Terry, Stout & Kraus

[57] ABSTRACT

An axial flow thermo-type air flow meter for internal combustion engines has a spider disposed in a main air passage formed in a body and having formed therein an auxiliary air flow passage including an axial auxiliary air flow passage portion accommodating a heat-generating resistor element for detecting a rate of engine intake air flow. The auxiliary air flow passage also includes more than one radial air flow passage portions which are connected to the axial air flow passage portion and curved and turned at their radially outer ends and then extend radially inwardly to outlet ends open to the main air passage, whereby the total length of the auxiliary air flow passage is increased to decrease the influence of pulsation of engine intake air flow on the air flow meter. Positioning of the outlet openings of the auxiliary air flow passage within a range of a radius from the axis of the main air flow passage, which radius is ½ of the radius of the main air flow passage, is effective to reduce fluctuation of the electric output of the air flow meter due to an unbalanced air flow velocity distribution occurring upstream of the air flow meter.

11 Claims, 7 Drawing Sheets

THERMO-TYPE AIR FLOW METER

BACKGROUND OF THE INVENTION

Field of the Invention

The present invention relates to a thermo-type air flow meter, and more particularly, to an axial flow thermo-type air flow meter suitably used to measure the rate of intake air flow in internal combustion engines for automobiles, the axial flow thermo-type air flow meter being of the type in which an auxiliary air flow passage with a heat-generating resistor element for detecting the rate of engine intake air flow accommodated therein is disposed within a main air flow passage.

Description of the Related Art

Hot-wire type air flow meters have been proposed in, for example, Japanese Patent Unexamined Publication Nos. 57-64109 and 61-65053. These hot-wire type air flow meters each have an auxiliary air flow passage which extends in a direction substantially perpendicular to a main air flow passage and which has a portion for changing the direction of air flow by 180°.

In the air flow meter disclosed in Japanese Patent Unexamined Publication No. 57-64109, a radial auxiliary air flow passage is separated into two portions by a partitioning wall extending in the radial direction, and the connecting portion of these two separate portions is formed by an axial air flow passage. As the air flow passage is separated into two parts by the partitioning plate, the structure of the air flow meter mounted on an engine is complicated. Furthermore, since the corner portion of the air flow passage which changes the direction of air flow by 180° is made of a thin plate, pressure loss in the air flow passage is increased, thus decreasing the air flow velocity and increasing changes generation of air flow velocity, with a resultant in the noises in the output of the hot-wire type air flow meter. In the air flow meter disclosed in Japanese Patent Unexamined Publication No. 61-65053, the direction of the air flow in the auxiliary air flow passage is changed by 180° in total by using two right-angled elbow tubes each of which changes the direction of the air flow passage by 90°. In this example, the air flow passage is not formed in the same plane, as in the former type of air flow meter. Consequently, the structure of the air flow meter mounted on the engine is complicated. Furthermore, pressure loss at the right-angled elbow tube portions is large, and the same problems as those of the former type thus occur. Japanese Patent Unexamined Publication No. 1-206223 discloses an axial hot-wire type air flow meter in which an auxiliary flow passage is formed within a main air flow passage. In this air flow meter, the auxiliary air flow passage includes an axial auxiliary air flow passage portion having an inlet open to the main air flow passage and extending parallel to the main air flow passage, and two radial auxiliary air flow passage portions formed in a straight line in directions perpendicular to the direction of the main air flow passage and in the radial directions and respectively having outlets open to the main air flow passage in the vicinity of the peripheral wall of the main air flow passage. A hot-wire element is disposed within the axial auxiliary air flow passage portion.

In four cylinder engines, the two-value phenomena of the average output voltage (inversion of the output) of the air flow meter caused by pulsations in the engine intake air flow are a serious problem. Occurrence of the two-value phenomena may be reduced by attenuating the magnitude of the pulsations which is achieved by increasing the total length of the auxiliary air flow passage. However, in the conventional axial hot-wire type air flow meters, it is not always possible to provide a sufficiently long radial auxiliary air flow passage portion because the provision of such a passage may be hindered due to the specification of an engine or the configuration of a tube of an air intake system. This results in the generation of the two-value phenomena.

SUMMARY OF THE INVENTION

A primary object of the present invention is to provide a hot-wire type air flow meter which is less affected by pulsations of the engine intake air flow which occur downstream of the meter.

Upstream of the air flow meter are disposed an air cleaner and a duct which may be the cause of the occurrence of separation and swirled air flow. Consequently, air flow velocity distribution in which air flow velocities are varied at the radial and circumferential positions of a main air flow passage, that is, an unbalanced air flow velocity distribution, occurs on the upstream side of the air flow meter due to the separation or swirled air flow. This unbalanced air flow velocity distribution pattern is varied according to the position and shape of the air cleaner and the duct. Conventional hot-wire type air flow meters in which the outlets of two radial auxiliary air flow passage portions are open in the vicinity of the peripheral wall of the main air flow passage are readily affected by changes in such unbalanced air flow velocity distribution, and their measured values thus change as the unbalanced air flow distribution changes. In the design of the passages of the intake air system, the position and shape of the air cleaner and duct vary depending on the type of vehicles. Therefore, provision of an air flow meter which is readily affected by changes in the air flow velocity distribution requires adjustment for accurate measurement of air flow rate. Such an air flow meter cannot be generalized.

A second object of the present invention is to provide a hot-wire type air flow meter which is less affected by changes in an unbalanced air flow velocity distribution which occurs upstream of the air flow meter.

To achieve the above-described objects, the present invention provides an axial flow thermo-type air flow meter which includes a body having formed therein a main air flow passage through which an intake air flows and a radial wall portion disposed in the main air flow passage and having formed therein an auxiliary air flow passage through which a part of the intake air flows. The auxiliary air flow passage accommodates a heat-generating resistor element for detecting a rate of engine intake air flow. The auxiliary air flow passage includes an axial auxiliary air flow passage portion having an inlet open to the main air flow passage and extending parallel to the main air flow passage and at least one radial auxiliary air flow passage portion extending in a direction substantially perpendicular to the main air flow passage and having an outlet open to the main air flow passage. The heat-generating resistor element is disposed in the axial auxiliary air flow passage portion. The radial auxiliary air flow passage portion is formed in one plane perpendicular to the axis of the main air flow passage and is bent at least at one portion thereof to change the direction of the air flow by substantially 180°.

In a preferred form, the inlet opening of the axial auxiliary air flow passage portion is located at the center of the main air flow passage, and the radial auxiliary air flow passage portion is formed by a single air flow passage portion connected to the axial auxiliary air flow passage portion and either a plurality of air flow passage portions which branch from the single air flow passage portion and extend to the respective outlet openings or a single air flow passage portion which extends to the outlet opening thereof.

In another preferred form, the outlet opening of the radial auxiliary air flow passage portion is located within a range of a radius from the axis of the main air flow passage, which radius is ½ of the radius of the main air flow passage.

In a further preferred form, the radial auxiliary air flow passage portion is formed in the radial wall portion such that the outlet opening thereof is located at the central portion of the main air flow passage.

In the present invention, the radial auxiliary air flow passage portion is curved at least at one portion thereof in a single plane substantially perpendicular to the main air flow passage so, that it changes a direction of the air flow by substantially 180°. Consequently, the length of the radial auxiliary air flow passage portion can be increased, thereby reducing pulsations sufficiently. Furthermore, since the air flow passage is formed in a single plane, the structure of the air flow meter can be simplified. Furthermore, if the portion for changing the direction of the air flow by 180° is smoothly curved in order to achieve reduction in the pressure loss, reduction in the air flow velocity will be prevented, and generation of noises in the output due to changes in time caused by separated air flow which is generated at a corner portion of the curved portion will also be reduced. In consequence, the output of the air flow meter can be made stable and the two-value phenomena due to pulsations in the engine intake air flow will not be readily generated.

Changes in the unbalanced air flow velocity distribution which occur upstream of the air flow meter due to changes in the position and the shape of an air cleaner and a duct are larger in the peripheral portion of the main air flow passage than at the central portion thereof. Thus, positioning of the inlet and outlet openings of the auxiliary air flow passage within a range of a radius from the axis of the main air flow passage, which radius is ½ of the radius of the main air flow passage, will be effective to reduce the influence of changes in the unbalanced air flow velocity distribution.

DESCRIPTION OF THE PREFERRED EMBODIMENTS

A first embodiment of the present invention will be described below with reference to FIGS. 1 to 5.

Figure 1:
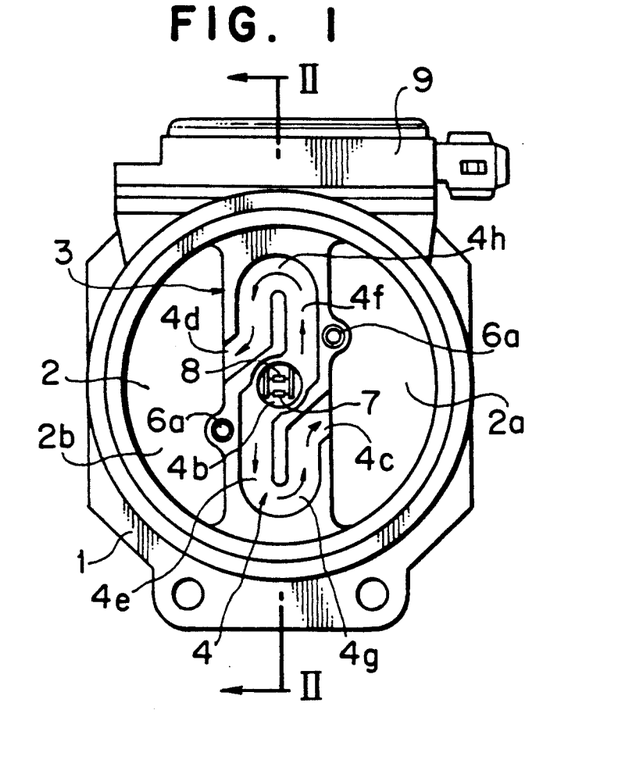
FIG. 1 is an end view, taken in the direction indicated by an arrow I in FIG. 2, of a first embodiment of a hot-wire type air flow meter according to the present invention, showing the state thereof in which a passage cover is removed.
Figure 2:
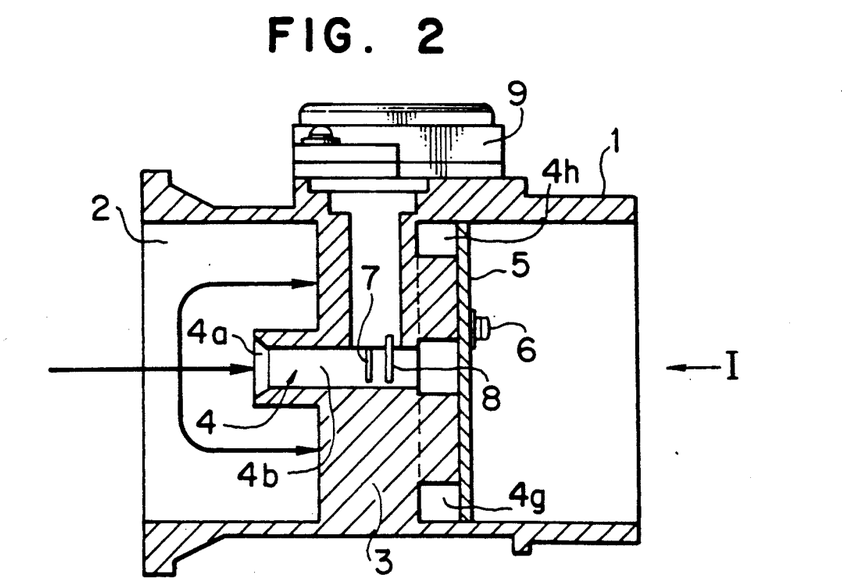
FIG. 2 is a sectional view of the hot-wire type air flow meter taken along the line II—II of FIG. 1.
Figure 3:
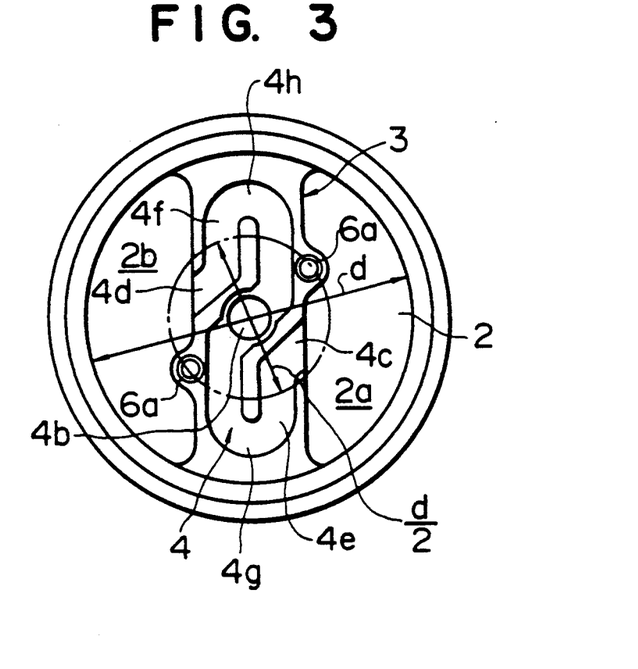
FIG. 3 shows the positional relation of outlet openings of an auxiliary air flow passage with to a main air flow passage;, FIGS. 4A to 4D respectively show different unbalanced air flow velocity distribution patterns to illustrate changes of such air flow velocity distributions and influence thereof on the air flow meter.

Referring first to FIGS. 1 and 2, a body 1 made by aluminum die casting has a main air flow passage 2 in it. In the main air flow passage 2, a spider 3 formed integrally with the body 1 is disposed across the main air flow passage 2 in the radial direction thereof. The spider 3 has in it an auxiliary air flow passage 4 through which a part of intake air passes. The auxiliary air flow passage 4 includes an inlet opening 4a open to the central portion of the main air flow passage 2, an axial auxiliary passage portion 4b connected to the opening 4a and formed parallel to the main air flow passage 2, and two radial auxiliary passage portions 4e and 4f formed in directions perpendicular to the main air flow passage 2 and in radial directions, which are separated from each other by 180°, and respectively having outlet openings 4c and 4d open to the main air flow passage 2. The radial auxiliary passage portions 4e and 4f each are in the form of a groove which opens to the end face of the spider 3. The grooves which form the radial auxiliary passage portions 4e and 4f are closed by a passage cover 5 which is fixed to the end face of the spider 3 by means of attaching screws 6. FIG. 1 shows the state in which the passage cover 5 is removed. Reference numerals 6a denote screw holes into which the attaching screws 6 are screwed. The two radial auxiliary passage portions 4e and 4f respectively have substantially semi-circular smoothly curved portions 4g and 4h which change the directions of air flows by substantially 180°. The outlet openings 4c and 4d of these radial auxiliary passage portions 4e and 4f are each located within the range of a radius from the axis of the main air flow passage which radius is ½ of the radius of the main air flow passage, as shown in FIG. 3.

The spider 3 having the two radial auxiliary air flow passage portions 4e and 4f divides the main air flow passage 2 having the circular cross-section into two main air flow passage portions 2a and 2b. The outlet openings 4c and 4d of the radial auxiliary air flow passage portions 4e and 4f are respectively open to the main air flow passage portions 2a and 2b.

Within the axial auxiliary air flow passage portion 4b are disposed a heat-generating resistor element 7 for detecting the rate of engine intake air flow and a temperature resistor element 8 for detecting the temperature of intake air. An electronic control module 9 for converting the rate of engine intake air flow detected by the heat-generating resistor element 7 into an electric signal is mounted on the outer surface of the body 1.

After air enters the body 1, it flows into both the main air flow passage 2 and the auxiliary air flow passage 4, as indicated by arrows in FIG. 2. The air which flows into the auxiliary air flow passage 4 flows first through the axial auxiliary air flow passage portion 4b where it makes contact with the heat-generating resistor body 7 and the temperature resistor element 8 and then flows into both the radial auxiliary air flow passage portions 4e and 4f. In these radial auxiliary air flow passage portions 4e and 4f, air flows first outwardly, then passes through the curved portions 4g and 4h which are curved by about 180° near the peripheral wall of the main air flow passage 2, then flows inwardly in the radial direction and finally flows out of the auxiliary air flow passage from the outlet openings 4c and 4d into the main air flow passage portions 2a and 2b at the central portion of the main air flow passage 2. It is to be noted that the body 1 may also be made of materials other than aluminum, such as plastics.

In the thermo-type air flow meter designed in the manner described above, if it is assumed that the pressure loss of the auxiliary air flow passage 4 is equal to the pressure loss of the main air flow passage 2 between the inlet and outlet openings of the auxiliary air flow passage 4, the relation between the main air flow passage 2 and the auxiliary air flow passage 4 is expressed as follows:

$$Lm \frac{dU}{dt} + Cm \frac{U^2}{2} = lb \frac{du}{dt} + Cb \frac{u^2}{2}$$

Lm: The equivalent length of the main air flow passage
U: The air flow velocity in the main air flow passage
Cm: The resistance coefficient of the main air flow passage
lb: The equivalent length of the auxiliary air flow passage
u: The air flow velocity in the auxiliary air flow passage
Cb: The resistance coefficient of the auxiliary air flow passage Therefore, using $$Cm \frac{U^2}{2} = Cb \frac{U^2}{2},$$

the dynamic relation between the velocity of the main air flow and the velocity of the auxiliary air flow is expressed as follows:

$$Lm \frac{dU}{dt} = lb \frac{du}{dt}$$

Thus, $du = dU \frac{Lm}{lb}$.

Thus, it is possible to decrease the pulsating changes in the velocity of the auxiliary air flow relative to dynamic pulsating changes in the velocity of the main air flow by increasing the overall length lb of the auxiliary air flow passage relative to the length Lm of the main air flow passage between the inlet and outlet openings of the auxiliary air flow passage.

Figure 5:
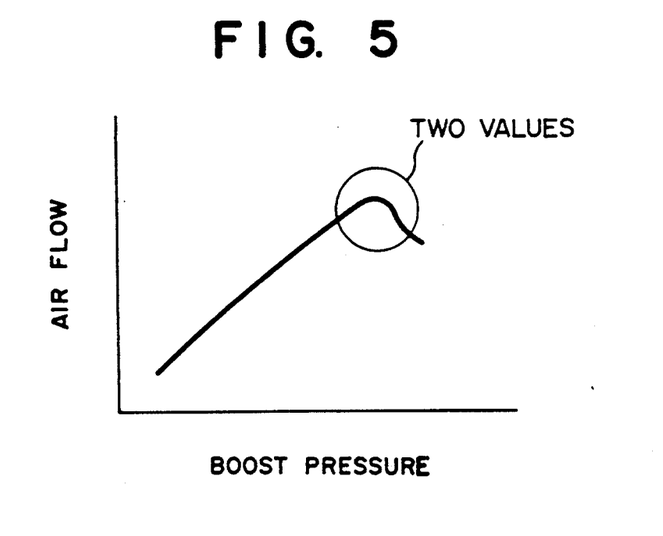
FIG. 5 shows the two-value phenomena.

In the four-cylinder engines, the two-value phenomena of the output voltage of the air flow meter caused due to pulsations in the engine intake air is a serious problem. More specifically, as the boost pressure (vacuum) is increased by increasing the opening of a throttle valve, the air flow rate detected by the air flow meter increases. However, when the boost pressure is increased to a value higher than a certain level, which is achieved by opening the throttle valve almost fully, the air flow rate detected by the air flow meter decreases, as shown in FIG. 5. This means that there are two boost pressures (openings) corresponding to the air flow rate detected when the boost pressure is higher than the certain level. Hence, the control unit cannot determine the corresponding operation condition when it receives electric signals representing those two values. This is the two-value phenomena. Since an increase in lb with respect to Lm is effective to decrease pulsations in the auxiliary air flow passage, as described above, the increase in lb is very effective for preventing the two-value phenomena.

In the present embodiment, it order to realize the structure in which the outlet openings 4c and 4d of the radial auxiliary air flow passage portions 4e and 4f are each located substantially at the central portion of the main air flow passage, the curved portions 4g and 4h for changing the directions of air flows by substantially 180° are respectively provided in the radial auxiliary air flow passage portions 4e and 4f. In this way, the length of each of the radial auxiliary air flow passage portions 4e and 4f can be made greater than the radius of the main air flow passage 2. Particularly, since the outlet openings 4c and 4d of the radial auxiliary air flow passage portions 4e and 4f are located within an area having a diameter of ½ of the diameter 'd' of the main air flow passage in this embodiment, the length of each of the radial auxiliary air flow passage portions 4e and 4f can be made about two times that of the radius of the main air flow passage 2. As a result, pulsations in the intake air flow in the auxiliary air flow passage can be reduced, to thereby decrease the occurrence of the two-value phenomena caused by the pulsations in the engine intake air flow.

Next, the static relation between the velocity of the main air flow and the velocity of the auxiliary air flow at a steady time is expressed as follows:

$$Lm = \frac{dU}{dt} = lb \frac{du}{dt} = 0$$

Therefore, $Cm \frac{U^2}{2} = Cb \frac{u^2}{2}$.

Hence, $u = U \sqrt{(Cm/Cb)}$

So, it is apparent that the velocity of the auxiliary air flow is dependent upon the velocity of the main air flow.

As stated above, the distribution of the air flow velocity on the upstream side of the air flow meter changes in accordance with the structure of an air cleaner and the shape of a duct. FIGS. 4A to 4D show examples of the air flow velocity distribution pattern. In the pattern shown in FIG. 4A, the velocity of air flow is substantially uniform in all the radial and circumferential positions. In the patterns shown in FIGS. 4B to 4D, the velocity of air flow is distributed non-uniformly in the radial and circumferential directions. Similar air flow velocity distributions occur in the vicinity of the outlet openings of the auxiliary air flow passage. As is clear from FIGS. 4A to 4D, changes in the air flow velocity caused by changes in an unbalanced air flow distribution pattern are greater in the vicinity of the peripheral wall which defines the body 1 than in the central portion of the main air flow passage.

Figure 4A:
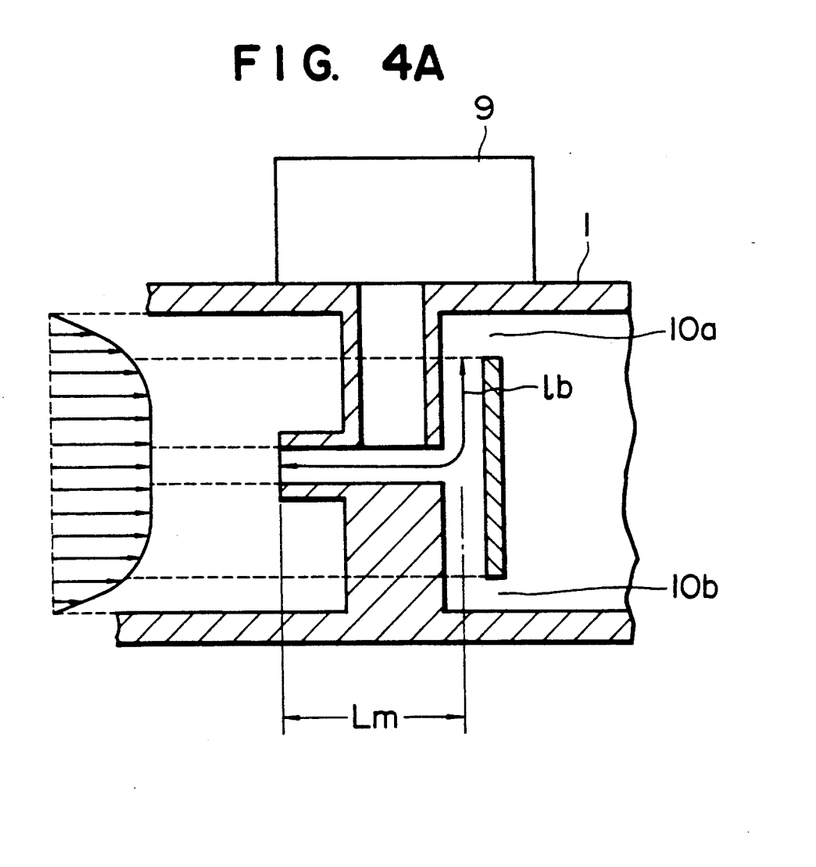
Figure 4B:
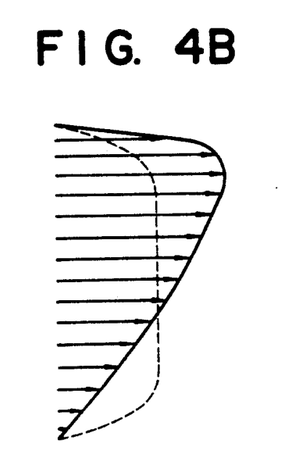
Figure 4C:
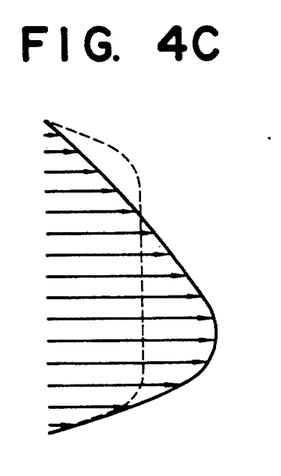
Figure 4D:
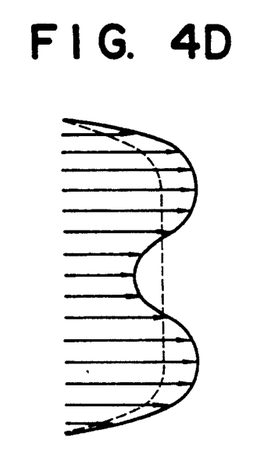

When the conventional air flow meter shown in FIG. 4A in which outlet openings 10a and 10b of the auxiliary air flow passage are provided in the vicinity of the peripheral wall of the main flow passage is subjected to the above-described changes in the air flow velocity distribution, the air flow velocity 'u' in the auxiliary air flow passage easily changes because of relatively large changes in the air flow velocity 'U' in the main air flow passage in the vicinity of the wall. Particularly, this tendency increases in the case in which the auxiliary air flow passage has a single outlet opening. Even when the auxiliary air flow passage has two outlet openings, as shown in FIG. 5, if the air flows in a distribution pattern unbalanced to one side of the center of the main air flow passage, as in the cases shown in FIGS. 4B and 4C, changes in the passage resistance are greater than the cases shown in FIGS. 4A and 4D in which the air flows at both sides of the center, thus readily generating changes in the air flow velocity.

In the air flow meter, changes in the air flow velocity in the vicinity of the center of the main air flow passage are less than those in the vicinity of the peripheral wall except for special cases. Therefore, positioning of the outlet openings 4c and 4d of the radial auxiliary air flow passage portions 4e and 4f in the central portion of the main air flow passage 2, as in the described embodiment, is effective to decrease fluctuation of the electric output of the air flow meter which occurs when distribution of the air flow velocity (the unbalanced air flow) changes in the vicinity of the inlet opening.

In this embodiment, since not only the inlet opening 4a of the auxiliary air flow passage 4 but also the outlet openings 4c and 4d thereof are disposed at the central portion of the main air flow passage 2, the air flow meter is less affected by changes in the air flow velocity distribution, and can thus be used in the air intake systems designed in various manners.

The present inventors have confirmed through experiments that the aforementioned advantages can be similarly assured when the inlet and outlet openings of the auxiliary air flow passage 4 are located within a radius from the central axis of the main air flow passage which is ½ of the radius of the main air flow passage.

A second embodiment of the present invention will be described below with reference to FIG. 6 which is a view similar to FIG. 1 shows the state in which the passage cover is removed. In this embodiment, three radial auxiliary air flow passage portions are formed in different radial directions.

Figure 6:
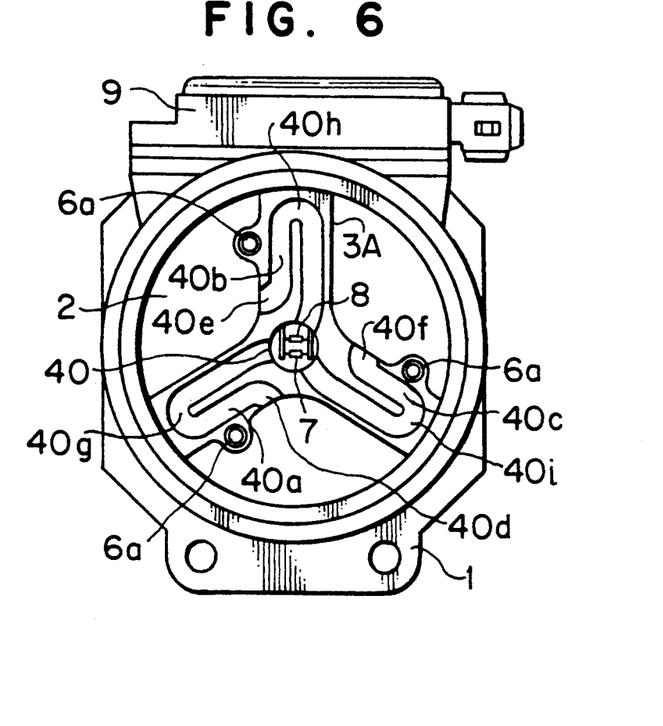
FIG. 6 is an end view similar to FIG. 1 but shows a second embodiment of the hot-wire type air flow meter according to the present invention.

In the structure shown in FIG. 6, a spider 3A has a shape which divides the main air flow passage 2 into three portions. The spider 3A has in it an axial auxiliary air flow passage portion 40 whose inlet opening is located at the central portion of the main air flow passage 2, and three radial auxiliary air flow passage portions 40a, 40b and 40c having the same form as that of the radial auxiliary air flow passage portions 4e and 4f in the first embodiment. That is, the radial auxiliary air flow passage portions 40a, 40b and 40c respectively have curved portions 40g, 40h and 40i for changing the directions of air flows by about 180°, and outlet openings 40d, 40e and 40f thereof located at the central portion of the main air flow passage 2. The aforementioned advantages of the first embodiment can also be assured in the second embodiment. The radial auxiliary air flow passage portions may be provided in the number of four or more.

Other embodiments of the present invention will be described with reference to FIGS. 7 to 9 which are views similar to FIG. 1 and show the states of the air flow meters in which the passage covers are removed.

Figure 7:
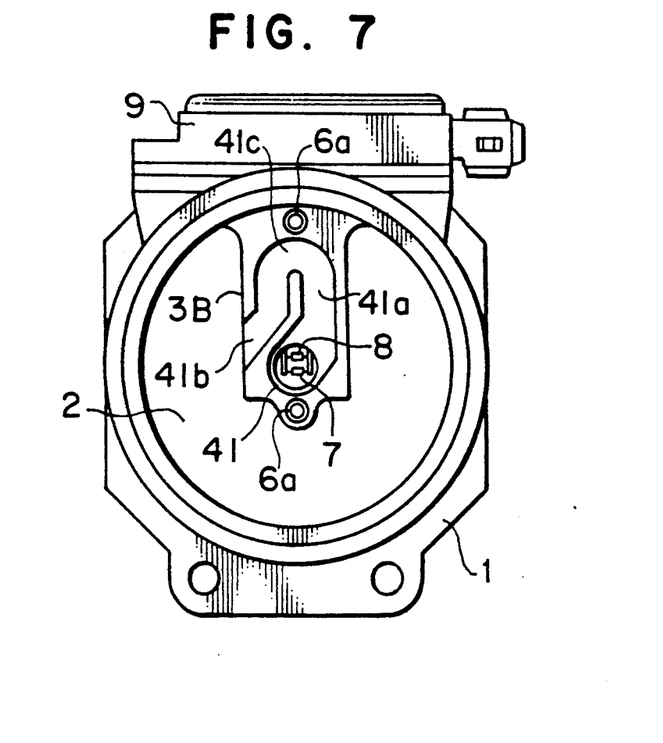
FIGS. 7 to 13 are end views similar to FIG. 1 but show third to ninth embodiments of the hot-wire type air flow meter according to the present invention.

In the third embodiment shown in FIG. 7, a cantilever type spider 3B has an axial auxiliary air flow passage portion 41 whose inlet opening is located at the central portion of the main air flow passage 2, and one radial auxiliary air flow passage portion 41a having the same form as that of the radial auxiliary air flow passage portions 4e and 4f in the first embodiment. That is, the radial auxiliary air flow passage portion 41a has a curved portion 41c for changing the direction of air flow by about 180°, and an outlet opening 41b thereof is located at the central portion of the main air flow passage 2. The afore-mentioned advantages of the first embodiment can also be assured in this third embodiment. Furthermore, in this embodiment, since the spider 3B is of the cantilever type, resistance to the air flow in the main air flow passage is reduced, thereby decreasing pressure loss.

Furthermore, in this embodiment, a sensor unit consisting of the spider 3B formed separately from the body 1 and an integral electronic control module mounted on the spider 3B, may be detachably mounted on the body 1. In this way, the structure of the body 1 which defines the main air flow passage is simplified. Furthermore, since the sensor unit can be handled as a single unit, initial adjustment and maintenance of the electronic control module are facilitated.

Figure 8:
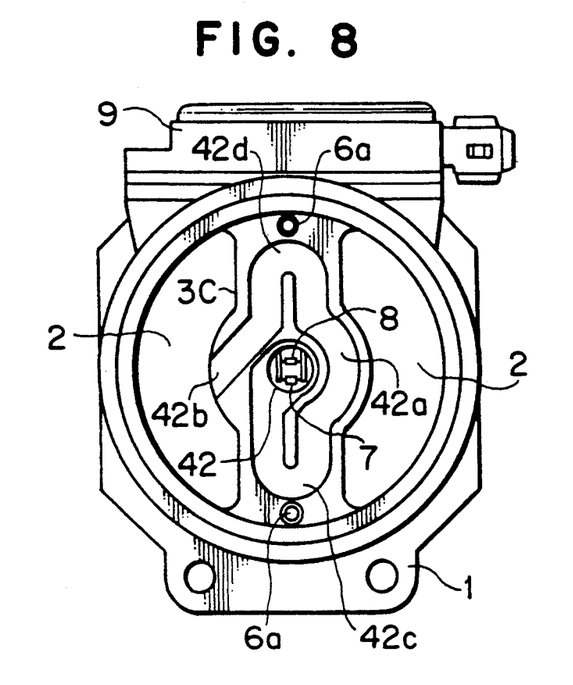

In the fourth embodiment shown in FIG. 8, a spider 3C is disposed across the main air flow passage 2, like the spider 3 shown in FIG. 1. The spider 3C has in it an axial auxiliary air flow passage portion 42 whose inlet opening is located at the central portion of the main air flow passage 2, and a radial auxiliary air flow passage portion 42a having a single outlet opening 42b at the central portion of the main air flow passage 2 and two curved portions 42c and 42d for respectively changing the direction of air flow by about 180°. Consequently, the length of the auxiliary air flow passage is increased to about four times that of the radius of the main air flow passage. In this embodiment, since the length of the auxiliary air flow passage is further increased, the two-value phenomena caused by pulsations of the engine intake air flow downstream of the air flow meter can be further reduced. This embodiment is particularly effective when it is applied to the four-cylinder engines whose intake air flow pulsates to a large degree.

Figure 9:
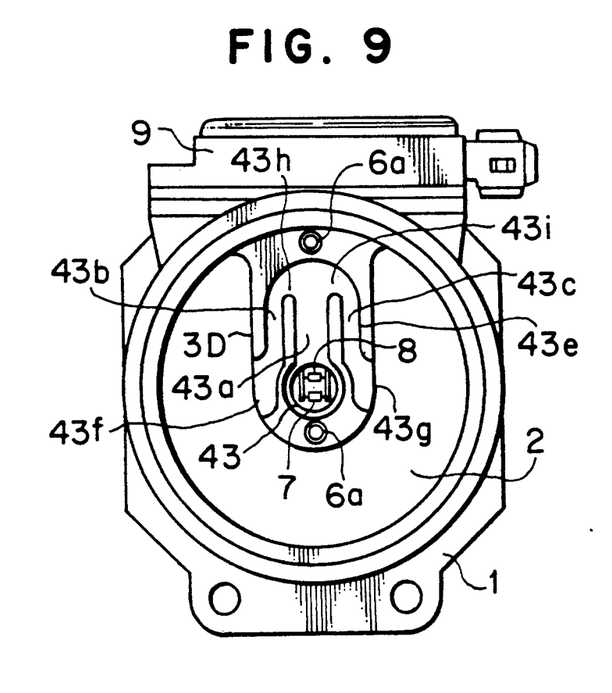
Figure 10:
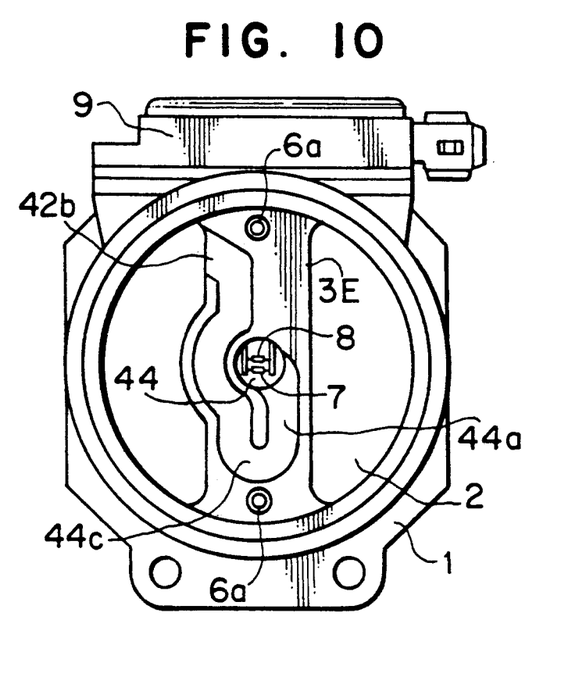

In the fifth embodiment shown in FIG. 9, a spider 3D is of the cantilever type, as in the case of the third embodiment shown in FIG. 7. The spider 3D has in it an axial auxiliary air flow passage portion 43 whose inlet opening is located at the central portion of the main air flow passage 2, and a composite radial auxiliary air flow passage portion 43e consisting of a single radial air flow passage portion 43a connected to the axial auxiliary air flow passage portion 43 and two divided air flow passage portions 43b and 43c branching from the radial air flow passage portion 43a. The air flow passage portions 43b and 43c of the radial auxiliary air flow passage portion 43e respectively have outlet openings 43f and 43g at the central portion of the main air flow passage. The portions of the divided air flow passage portions 43b and 43c which are branched from the single air flow passage portion 43a are curved to form curved portions 43h and 43i for changing the direction of air flow by about 180°. In this embodiment, since the length of the radial auxiliary air flow passage portion is further increased as compared with the embodiment shown in FIG. 7, occurrence of the two-value phenomena can be further reduced. Furthermore, it is possible to form a sensor unit that can be detachably mounted on the body 1 by the spider 3D and the electronic control module 9, as in the case of the embodiment shown in FIG. 7. Such a structure facilitates initial adjustment and maintenance of the electronic control module.

Sixth to ninth embodiments of the present invention will be described with reference to FIGS. 10 to 13. In the sixth embodiment shown in FIG. 10, a spider 3E is disposed across the main air flow passage 2, like the spider 3 shown in FIG. 1. The spider 3E has in it an axial auxiliary air flow passage portion 44 whose inlet is located at the central portion of the main air flow passage 2, and a single radial auxiliary air flow passage portion 44a having a curved portion 44c for changing the direction of air flow by about 180°. An outlet opening 44b of the radial auxiliary air flow passage portion 44a is located at a position offset from the axis of the main air flow passage 2.

Figure 11:
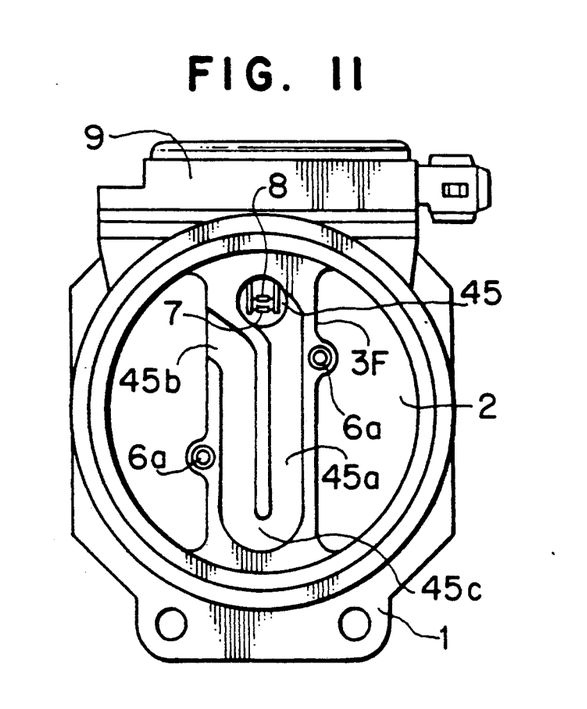

In the seventh embodiment of the present invention, a spider 3F is disposed across the main air flow passage 2. The spider 3F has in it an axial auxiliary air flow passage portion 45 whose inlet is located at a position offset from the axis of the main air flow passage 2, and a single radial auxiliary air flow passage portion 45a having a curved portion 45c for changing the direction of air flow by 180°. An outlet opening 45b of the radial auxiliary air flow passage portion 45a is also located at a position offset from the axis of the main air flow passage.

Figure 12:
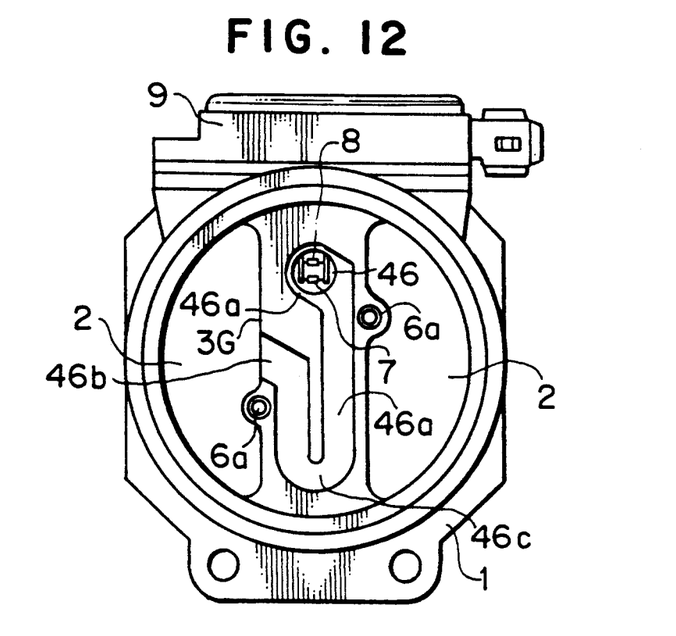

In the eighth embodiment shown in FIG. 12, a spider 3G is disposed across the main air flow passage 2, like the spider 3 shown in FIG. 1. The spider 3G has in it an axial auxiliary air flow passage portion 46 whose inlet opening is located at a position offset from the axis of the main air flow passage 2, and a single radial auxiliary air flow passage portion 46a having a curved portion 46c for changing the direction of air flow by about 180°. An outlet opening 46b of the radial auxiliary air flow passage 46a is located at the central portion of the main air flow passage 2. Consequently, the length of the auxiliary air flow passage can be increased to about three times that of the radius of the main air flow passage.

Figure 13:
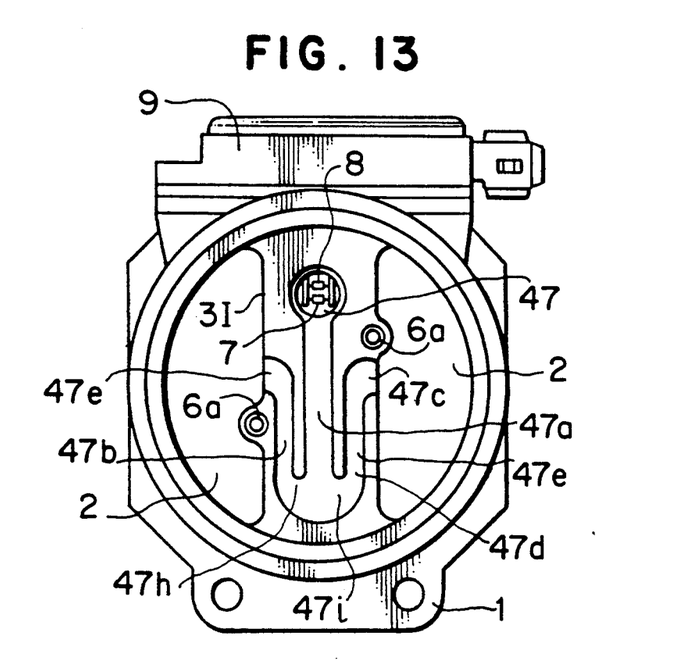

In the ninth embodiment shown in FIG. 13, a spider 31 is disposed across the main air flow passage, like the spider 3G shown in FIG. 12. The spider has in it an axial auxiliary air flow passage portion 47 whose inlet opening is located at a position offset from the axis of the main air flow passage 2, and a single composite radial auxiliary air flow passage portion 47e consisting of a single radial air flow passage portion 47a connected to the axial auxiliary air flow passage portion 47, and two air flow passage portions 47b and 47c branching from the air flow passage portion 47a, as in the case of the embodiment shown in FIG. 9. The air flow passage portions 47b and 47c respectively have openings 47f and 47g at the central portion of the main air flow passage. The portions of the air flow passage portions 47b and 47c which branch from the air flow passage portion 47a are curved to form portions 47h and 47i for changing the direction of air flow by about 180°.

In each of the embodiments shown in FIGS. 10 to 13, the length of the auxiliary air flow passage is increased, as in the preceding embodiments. Consequently, the two-value phenomena caused by pulsations in the intake air flow which occur downstream of the air flow meter can be prevented very effectively.

In the embodiments shown in FIGS. 11 to 13, the inlet opening of each of the axial auxiliary air flow passage portions 45, 46 and 47 is offset from the center of the main air flow passage. Thus, the inlet opening may have an elliptical form in order to enhance stability thereof against the unbalanced air flow.

As will be understood from the foregoing description, it is possible according to the present invention to provide a hot-wire type air flow meter which is less affected by changes in the unbalanced air flow distribution which occurs upstream of the spider and which can be applied to the air intake systems designed in various manners. It is also possible to provide a hot-wire type air flow meter which decreases the occurrence of the two-value phenomena caused by pulsations in the engine intake air flow and which is hence highly reliable.

What is claimed is:

1. An axial flow thermo-type air flow meter comprising: a body having formed therein a main air flow passage through which an intake air flows and a radial wall portion disposed in said main air flow passage and having formed therein an auxiliary air flow passage through which a part of the intake air flows, said auxiliary air flow passage accommodating a heat-generating resistor element for detecting a rate of engine intake air flow, said auxiliary air flow passage including an axial auxiliary air flow passage portion having an inlet open to said main air flow passage and extending parallel to said main air flow passage and at least one radial auxiliary air flow passage portion extending in a direction substantially perpendicular to said main air flow passage and having an outlet open to said main air flow passage, said heat-generating resistor element being disposed in said axial auxiliary air flow passage portion, and wherein said radial auxiliary air flow passage portion is formed in one plane perpendicular to the axis of the main air flow passage and includes a first part which extends substantially linearly in a radial direction from said axial auxiliary air flow passage portion to a point adjacent an inner peripheral wall of said main air flow passage, a second part connected to said first part and which changes the direction of the air flow through said radial auxiliary air flow passage portion at said point by substantially 180° and a third part which extends substantially linearly in a radial direction from said second part to said outlet.

2. An axial flow thermo-type air flow meter according to claim 1, wherein second part of said radial auxiliary air flow passage portion comprises at least one curved portion disposed between said first and third parts.

3. An axial flow thermo-type air flow meter according to claim 1, wherein said auxiliary air flow passage includes a single radial auxiliary air flow passage portion connected to said axial auxiliary air flow passage portion and a plurality of air flow passage portions which branch from said single radial air flow passage portion and extend to respective outlet openings.

4. An axial flow thermo-type air flow meter according to claim 1, wherein the inlet opening of said axial auxiliary air flow passage portion is located substantially at a center of said main air flow passage, wherein said auxiliary air flow passage includes a plurality of radial auxiliary air flow passage portion formed in a plurality of different directions, and wherein said radial wall portion has a shape which corresponds to said radial auxiliary air flow passage portions formed in the plurality of different directions and divides said main air flow passage into a plurality of main air flow passage portions, the outlet openings of said radial auxiliary air flow passage portions respectively opening to said plurality of main air flow passage portions.

5. An axial flow thermo-type air flow meter according to claim 1, wherein the inlet opening of said axial auxiliary air flow passage portion is located substantially at a center of said main air flow passage, wherein said radial auxiliary air flow passage portion has at least one curved portion for changing a direction of the air flow by 180° in a plane substantially perpendicular to the axis of said main air flow passage, and wherein the outlet opening of said auxiliary air flow passage is located at a given position of said main air flow passage.

6. An axial flow thermo-type air flow meter according to claim 1, wherein the inlet opening of said axial auxiliary air flow passage portion is located within said main air flow passage at a given position offset from a center of said main air flow passage, wherein said radial auxiliary air flow passage portion has at least one curved portion for changing the direction of the air flow by 180° in a plane substantially perpendicular to said main air flow passage, and wherein the outlet opening of the auxiliary air flow passage portion is located at a given position of said main air flow passage.

7. An axial flow thermo-type air flow meter according to claim 5, wherein the outlet of said radial auxiliary air flow passage portion is located within a distance from the axis of said main air flow passage which is ½ of the radius of the main air flow passage.

8. An axial flow thermo-type air flow meter according to claim 6, wherein the outlet of said radial auxiliary air flow passage portion is located within a distance from the axis of said main air flow passage which is ½ of the radius of the main air flow passage.

9. An axial flow thermo-type air flow meter including a body having formed therein a main air flow passage through which an intake air flows and a radial wall portion disposed in said main air flow passage and having formed therein an auxiliary air flow passage through which a part of the intake air flows, said auxiliary air flow passage accommodating a heat-generating resistor element for detecting a rate of engine intake air flow, said auxiliary air flow passage including an axial auxiliary air flow passage portion having an inlet open to said main air flow passage and extending parallel to said main air flow passage and at least one radial auxiliary air flow passage portion extending in a direction substantially perpendicular to said main air flow passage and having an outlet open to said main air flow passage, said heat-generating resistor element being disposed in said axial auxiliary air flow passage portion, wherein said radial auxiliary air flow passage portion is formed in said radial wall portion such that the outlet opening thereof is located substantially at a central portion of said main air flow passage, and wherein said radial auxiliary air flow passage portion includes a first part which extends radially from said axial auxiliary air flow passage portion to a point adjacent an inner peripheral wall of said main air flow passage, a second part extending from said first part and which changes the direction of the air flow through said radial auxiliary air flow passage portion by substantially 180°, and a third part extending from said second part radially inwardly to said outlet.

10. An axial flow thermo-type air flow meter including a body having formed therein a main air flow passage through which an intake air flows and a radial wall portion disposed in said main air flow passage and having formed therein an auxiliary air flow passage through which a part of the intake air flows, said auxiliary air flow passage accommodating a heat-generating resistor element for detecting a rate of engine intake air flow, said auxiliary air flow passage including an axial auxiliary air flow passage portion having an inlet open to said main air flow passage and extending parallel to said main air flow passage and at least one radial auxiliary air flow passage portion extending in a direction substantially perpendicular to said main air flow passage and having an outlet open to said main air flow passage, said heat-generating resistor element being disposed in said axial auxiliary air flow passage portion, wherein said radial auxiliary air flow passage portion is formed in one plane perpendicular to the axis of the main air flow passage and includes first and second linear portions connected by a portion which is bent in order to change the direction of the air flow within said radial auxiliary air flow passage portion by substantially 180°, with the outlet of said radial auxiliary air flow passage portion being located within a distance from the axis of said main air flow passage which is one-half of the radius of the main air flow passage.

11. An axial flow thermo-type air flow meter including a body having formed therein a main air flow passage through which an intake air flows and a radial wall portion disposed in said main air flow passage and having formed therein an auxiliary air flow passage through which a part of the intake air flows, said auxiliary air flow passage accommodating a heat-generating resistor element for detecting a rate of engine intake air flow, said auxiliary air flow passage including an axial auxiliary air flow passage portion having an inlet open to said main air flow passage and extending parallel to said main air flow passage and at least one radial auxiliary air flow passage portion extending in a direction substantially perpendicular to said main air flow passage and having an outlet open to said main air flow passage, said heat-generating resistor element being disposed in said axial auxiliary air flow passage portion, wherein said radial auxiliary air flow passage portion is formed in said radial wall portion such that the outlet opening thereof is located substantially at a central portion of said main air flow passage, and wherein said radial auxiliary air flow passage portion is formed in one plane perpendicular to the axis of the main air flow passage and has first and second linear portions coupled by at least one curved portion for changing the direction of air flow in said radial auxiliary air flow passage portion by substantially 180°.

* * * * *